United States Patent [19]

Gahn et al.

[11] Patent Number: 4,543,302

[45] Date of Patent: Sep. 24, 1985

[54] NEGATIVE ELECTRODE CATALYST FOR THE IRON CHROMIUM REDOX ENERGY STORAGE SYSTEM

[75] Inventors: Randall F. Gahn, Columbia Station; Norman H. Hagedorn, Berea, both of Ohio

[73] Assignee: The United States of America as represented by the Administrator of the National Aeronautics and Space Administration, Washington, D.C.

[21] Appl. No.: 642,310

[22] Filed: Aug. 20, 1984

[51] Int. Cl.⁴ ..................... H01M 8/18; H01M 10/36
[52] U.S. Cl. ....................................... 429/15; 429/19; 429/51; 429/109
[58] Field of Search ................... 429/15, 51, 101, 105, 429/109, 19

[56] References Cited

U.S. PATENT DOCUMENTS

| 4,192,910 | 3/1980 | Frosch et al. | 429/105 |
| 4,307,159 | 12/1981 | Hammond et al. | 429/105 |
| 4,468,441 | 8/1984 | D'Agostino et al. | 429/105 |

Primary Examiner—Donald L. Walton
Attorney, Agent, or Firm—James A. Mackin; John R. Manning

[57] ABSTRACT

A REDOX cell to operate at elevated temperatures and utilizing the same two metal couples in each of the two reactant fluids is disclosed. Each fluid includes a bismuth salt and may also include a lead salt. A low cost, cation permselective membrane separates the reactant fluids.

20 Claims, 5 Drawing Figures

NEGATIVE ELECTRODE CATALYST FOR THE IRON CHROMIUM REDOX ENERGY STORAGE SYSTEM

DESCRIPTION

1. Origin of the Invention

The invention described herein was made by Government employees and may be used by or for the Government without the payment of any royalties thereon or therefor.

2. Technical Field

This invention relates to electrochemical cells for storing electrical charges and is directed more particularly to reduction-oxidation (REDOX) cells.

One of the most highly developed REDOX cells presently known uses an anode fluid having a chromic/chromous couple and a cathode fluid having a ferrous/ferric couple. The anode and cathode fluids are aqueous HCl solutions, one containing iron chloride and the other containing chromium chloride. Electric power is stored in the REDOX cell by applying a difference of electric potential between an inert electrode disposed in the anode fluid and an inert electrode disposed in the cathode fluid.

In general, the inert electrodes for a REDOX cell must be nonreactive with the anode and cathode fluids while, at the same time, promoting the REDOX reaction on their surfaces. In the case of the chromium (ANODE) reactant, this latter requires a light catalyst loading on the inert electrode. Further, the inert electrodes should be a porous material which is a good electrical conductor. Graphite cloths or felts are commonly used as electrodes in REDOX cells.

A relatively detailed description of the operation and structure of REDOX cells is given in U.S. Pat. No. 3,996,064. The electrode considerations discussed in that patent refer to the anode and cathode fluids which are sometimes called soluble electrodes in contrast to the inert electrodes.

During the operation of a REDOX cell and during recharging, hydrogen gas can be produced at the inert electrode in the anode fluid by electrochemical reactions. The hydrogen generating reaction is undesirable because the REDOX cell will eventually acquire a different state of charge between the anode and cathode fluids.

When REDOX cells are in use, it is possible for the cells to become completely discharged or even reversed in polarity. This can have a deleterious effect upon the performance of the cells when they are recharged. This effect is believed to result from irreversible changes in the catalyst on the negative electrode.

Another characteristic of REDOX cells is that after exposure of an inert catalyzed electrode to air, such as might occur during a repair, a charging voltage substantially higher than the original voltage is required. Additionally, the discharge voltage for a particular discharge current is lower than its value prior to the air exposure of the inert catalyzed electrode.

BACKGROUND ART

U.S. Pat. No. 4,382,116 to Gahn et al discloses a zirconium carbide coating on an inert electrode in the anode fluid of a REDOX cell. The zirconium carbide coating is catalytic for the oxidation of chromous ions to chromic ions and vice-versa as well as being highly irreversible with respect to hydrogen evolution.

U.S. Pat. No. 4,192,910 to Frosch discloses that an inert electrode of a REDOX cell disposed in the anode fluid may be plated with a layer of copper, silver or gold to act as a catalyst for the reduction-oxidation of chromium ions. An overlayer of lead minimizes hydrogen evolution at the surface of the inert electrode.

U.S. Pat. No. 4,454,649 to Jalan et al teaches that an improved inert electrode for the anode fluid of a REDOX cell is made by subjecting a carbon felt to a methanol-water solution containing chloroauric acid after being thoroughly cleansed. The carbon felt is then dried and heat treated. The inert anode electrode made by this process has low hydrogen evolution characteristics.

U.S. Pat. No. 3,444,003 to Moser discloses an electrode for use in an electrochemical device such as a fuel cell. The electrode is made by electrodepositing a layer of catalytic noble metal from a solution containing a lead salt onto a conductive substrate. An overlayer of noble metal free of lead is then deposited on the electrode.

U.S. Pat. No. 3,467,554 to Forten et al discloses an electrochemical cell electrode in which a palladium-gold alloy containing hydrophobic polymer particles is coated on an electrode base such as nickel or carbon.

SUMMARY OF THE INVENTION

The invention is directed to a REDOX cell which operates at a relatively high temperature and the performance of which is not degraded due to complete discharge or reverse charge. As contrasted to the prior art, the cell has more consistent performance of the soluble electrodes (the anode and cathode fluids), simpler, less costly fabrication of the inert electrodes and satisfactory performance after air exposure of one or more of the inert electrodes such as might occur during a repair operation. These advantages are achieved by utilizing identical aqueous acidified reactant fluids, each containing both of the REDOX couples as well as a bismuth salt.

DESCRIPTION OF A PREFERRED EMBODIMENT

Figure 1:
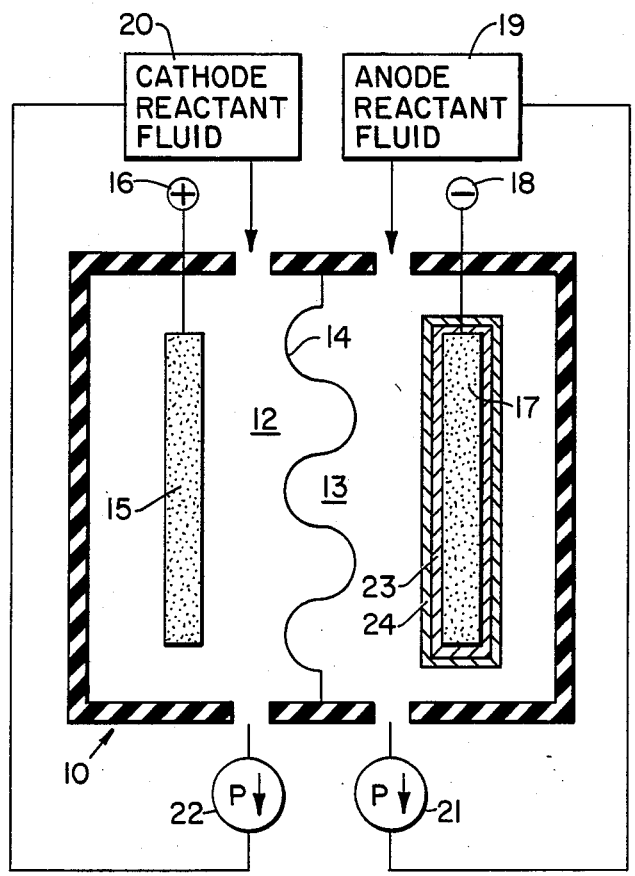
FIG. 1 is a schematic cross-sectional view of the REDOX cell embodying the invention, also schematically showing the anode and cathode fluid supply systems.

Referring now to FIG. 1, there is shown a REDOX cell 10 comprising a container 11 divided into first and second chambers 12 and 13 by a cation permselective membrane 14. Inert, electrically conductive electrodes such as carbon electrodes 15 and 17 are disposed in chambers 12 and 13, respectively, and are connected to respective output terminals 16 and 18.

In order to produce a difference of electric potential between the output terminals 16 and 18 an anode reactant fluid is circulated from a reservoir 19 through chamber 13 of the REDOX cell 10 and returned by a pump 21 to the reservoir. Similarly, a cathode reactant fluid from reservoir 20 is circulated through the chamber 12 and is returned by a pump 22 to the reservoir 20.

The cell 10 shown in FIG. 1 is in a charged state, as indicated by the positive and negative symbols on the output terminals 16 and 18, respectively. Advantageously, the cell of the present invention may be charged to a polarity opposite that shown in FIG. 1 without any loss of performance. As will be explained presently, this is possible because each reactant fluid contains metal salts of both REDOX couples to be used. Both fluids also contain a bismuth salt such as bismuth nitrate.

When the REDOX cell 10 is at a zero state of charge (SOC) the inert carbon electrodes 15 and 17 are substantially identical. However, as the cell is charged, the inert electrode which receives a negative potential with respect to the other inert electrode will first be coated with a layer of bismuth 23 which is deposited from the reactant fluid. As the voltage between the output terminals 16 and 18 increases, a voltage will be reached at which an overlayer of lead 24 can also be deposited on the bismuth layer 23 if the reactant fluid contains, in addition to the bismuth salt, a lead salt such as lead chloride. Fully discharging the cell will cause the lead and bismuth layers to deplate sequentially.

As mentioned previously, the reactant fluids are identical when the REDOX cell 10 is at zero state of charge. Both fluids are three normal aqueous HCl solutions, each containing both of the REDOX couples to be used and including a bismuth salt such as bismuth nitrate. In the preferred embodiment of the invention, both fluids contain iron chloride and chromium chloride.

As cell 10 is charged by applying a voltage of the polarity as indicated on output terminals 16 and 18, the fluid in chamber 12 will become the cathode fluid for subsequent discharge while the fluid in chamber 13 will become the anode fluid. Thus, in chamber 12, the $Fe^{+3}$ ions become the active species while in chamber 13 the $Cr^{+2}$ ions become the active species. Because both fluids contain both of the REDOX couples used, they are referred to as mixed reactant fluids.

In accordance with the invention, both reactant fluids include a bismuth salt such as bismuth nitrate to catalyze the inert REDOX negative electrode. If a lead salt such as lead chloride is also incorporated in the reactant fluids, a layer of lead will be deposited over the layer of bismuth on the inert electrode which is at negative potential.

Advantageously, in the REDOX cell embodying the invention, the membrane 14 need not be highly permselective as in prior art REDOX cells where one of the REDOX couples such as iron is in one reactant fluid, while the other REDOX couple such as chromium is in the other reactant fluid. These less selective membranes are readily available and are much less costly than the highly permselective types.

The membrane used in the REDOX cell embodying the invention to obtain the data for FIGS. 2 through 5 is identified as ML-21 obtained from RAI Research Corporation, Hauppauge, LI, NY. The membrane has a resistivity which decreases from about 1 ohm$-cm^2$ at 40° C. to less than 0.3 ohm$-cm^2$ at about 65° C. This characteristic contributes to the attainment of acceptable performance for a REDOX cell embodying the invention in a range of from about 55° C. to about 75° C., with about 65° C. being the preferred operating temperature. The primary reason, however, for improved operation in the temperature range of from 55° C. to 75° C. is a change in the chromium solution chemistry. This change is a shift in equilibrium from an inactive chromium species to a more active species. The result is improved charging rates up to levels greater than 90% state of charge.

A problem that occurs with the operation of a REDOX cell at an elevated temperature, that is, one substantially higher than ambient, is the reduced ionic selectivity of permselective membranes developed for use with unmixed reactants at room temperatures. As a result, cross mixing rates of the iron and chromium reactants increase significantly so that the reactants approach equimolar conditions much faster than acceptable. The use of mixed reactants substantially eliminates this problem because, as discussed previously, membranes with low permselectivity are acceptable.

In accordance with the invention, two identical mixed reactant fluids are circulated through two respective chambers of a REDOX cell. Each fluid includes iron chloride and chromium chloride in a three normal aqueous HCl solution. Bismuth nitrate is added to each solution so that charging of the REDOX cell will cause a bismuth coating to form on the inert electrode which is at negative potential. The amount of bismuth added to each reactant fluid is an amount such that about 50 micrograms of bismuth per square centimeter of electrode projected area is deposited. If a lead overlayer is desired on the negative inert electrode, lead chloride also is added to the reactant fluids. The amount of lead chloride added is such as to cause about 100 micrograms of lead per square centimeter of electrode projected area to be deposited on the bismuth layer.

Figure 2:
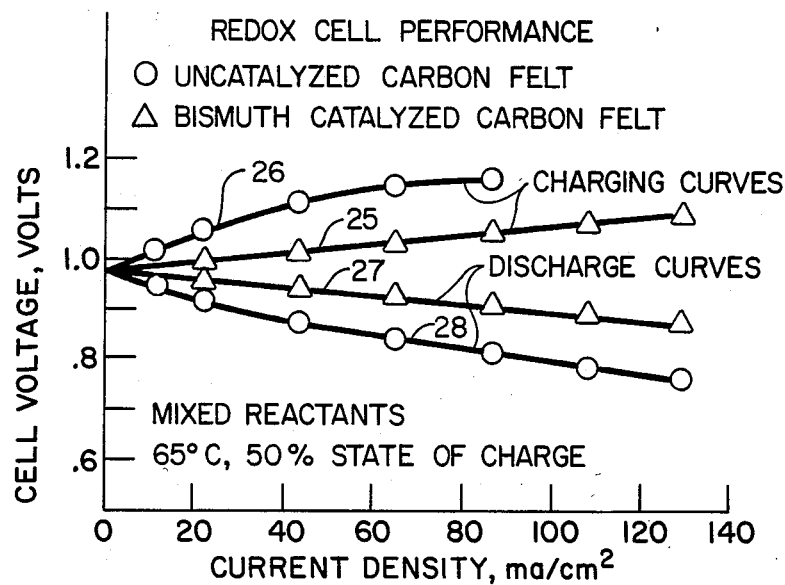
FIG. 2 illustrates performance of a REDOX cell with and without bismuth added to the reactant fluids.

Referring now to FIG. 2, the curve 25 indicates that for any particular current density, a lower charging voltage is required where the inert electrode is coated with bismuth than is required for the uncoated electrode as represented by the curve 26. Curve 27 indicates that a higher discharging voltage is obtained from the REDOX cell when the inert electrode is catalyzed with bismuth, as compared to the voltage obtained from an uncatalyzed inert electrode as represented by the curve 28.

Figure 3:
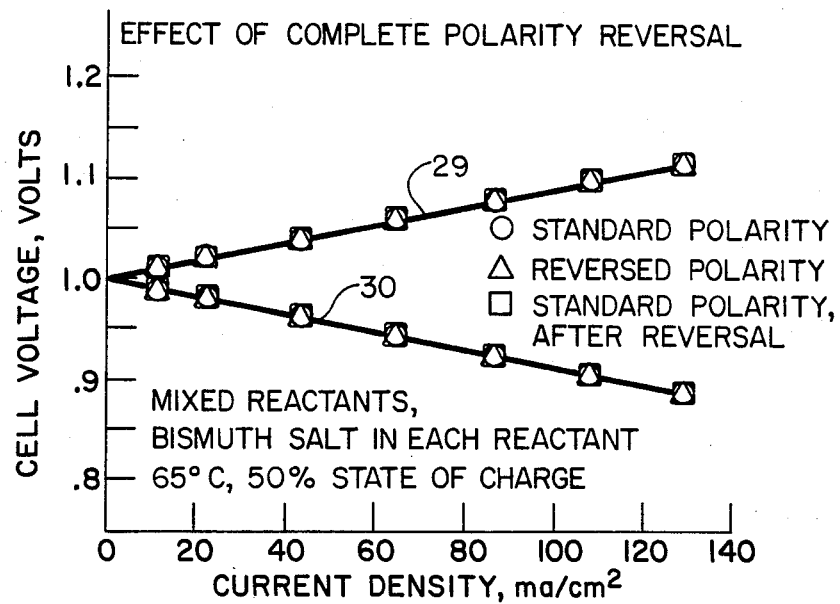
FIG. 3 is a graph of voltage vs. current for a cell having identical anode and cathode fluids including bismuth before and after reversal of polarity.

In FIG. 3, the charging curve 29 and the discharge curve 30 illustrate that after the REDOX cell embodying the invention is charged, then charged in the opposite direction and finally returned to its original polarity, there is no change in performance of the cell. Further, hydrogen evolution at the inert electrodes is not greater after polarity reversal as was the case in prior art REDOX cells.

Figure 4:
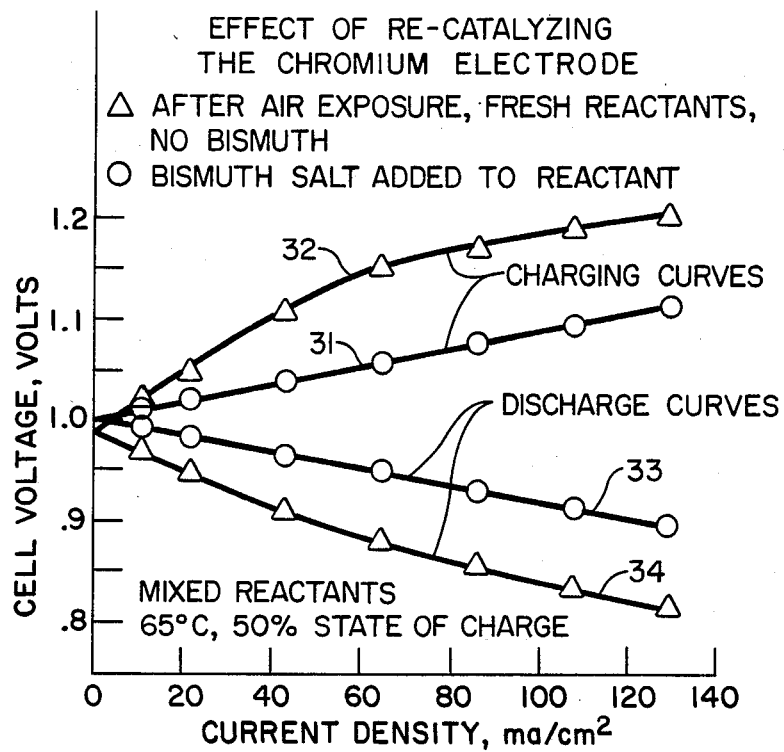
FIG. 4 shows voltage vs. current curves after exposure of one of the inert electrodes to air but with fresh reactant fluids.

In FIG. 4, the charge curves 31 and 32 for respective cells with and without bismuth added to the reactant fluids and the respective discharge curves 33 and 34 for such cells indicate that a REDOX cell with bismuth salt in the reactants requires lower voltage on charge to attain a particular current density while providing higher output voltage for a particular current density when discharging when these tests are carried out after exposure of the electrodes to oxidation conditions in air.

Figure 5:
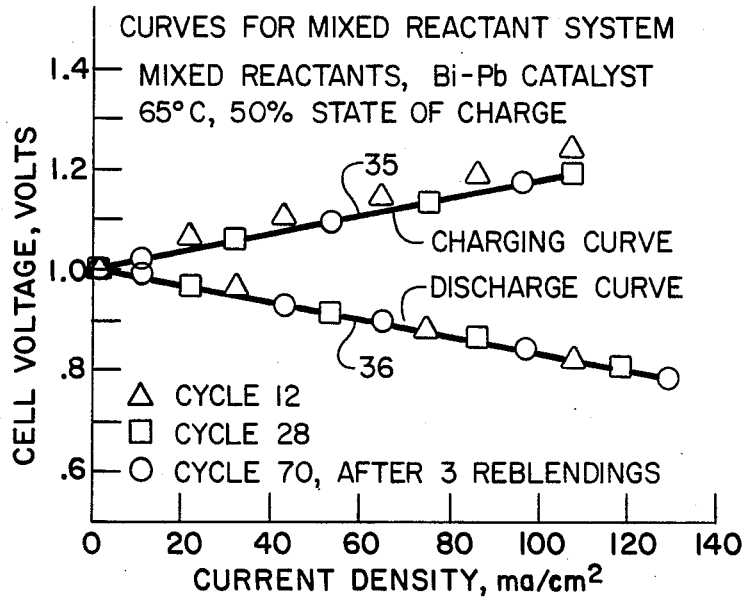
FIG. 5 illustrates the voltage vs. current curves on charge and discharge after three selected cycles of operation.

Referring now to FIG. 5, the charge curve 35 and the discharge curve 36 are substantially unchanged after 28 cycles of operation. After 70 cycles, the curves are still substantially unchanged although the reactant fluids have been reblended three times. It should be noted that the data used to plot curves 35 and 36 of FIG. 5 was obtained with lead chloride being included with the bismuth in each of the reactant fluids.

While the cell described above utilizes the iron and chromium REDOX couples, as mixed reactants in each of the reactant fluids of a REDOX cell, other couples may be used. Couples as described in U.S. Pat. No. 3,996,064 include metal ions such as vanadium, manganese and cerium. Other REDOX couples which enter into reduction-oxidation reactions are generally well-known. After being charged and recharged numerous times, as illustrated in FIG. 5, there is a significant decrease in volume of the chromium solution (anode reactant) and an equal increase in volume of the iron solution (cathode reactant). To equalize the volumes of the reactant fluids, they are periodically reblended or back mixed after passing through the respective anode and cathode chambers of the REDOX cell.

It will be understood that changes and modifications may be made to the above-described invention by those skilled in the art. Such variations are believed to be included within the scope of the invention, as set forth in the claims appended hereto.

We claim:

1. A REDOX system comprising:
    a cell having first and second chambers separated by a cation permeable membrane;
    a first electrically conductive, electrode disposed in said first chamber;
    a second electrically conductive electrode disposed in said second chamber;
    a first reactant fluid including iron chloride, chromium chloride and bismuth nitrate in an aqueous HCl solution, said first and second electrodes being inert to the reactant fluid and;
    a second reactant fluid including iron chloride, chromium chloride and bismuth nitrate in an aqueous HCl solution, said first and second electrodes being inert to the reactant fluid;
    means for directing said first and second reactant fluids through said first and second chambers, respectively, whereby a difference in electrical potential applied between said first and second electrodes causes bismuth to plate onto the most negative electrode.

2. The REDOX system of claim 1 wherein each of said reactant fluids include lead chloride dissolved therein, whereby lead is deposited over the bismuth on the most negative electrode because of the difference of electric potential applied between the first and second electrodes.

3. The REDOX system of claim 1 wherein said first and second electrodes are made of carbon felt.

4. The REDOX system of claim 2 wherein the amount of bismuth nitrate in each of the reactant fluids is in an amount such as to deposit about 50 ug of bismuth per $cm^2$ of electrode projected area.

5. The REDOX system of claim 2 wherein the amount of lead chloride in each of the reactant fluids is in an amount such as to deposit about 100 ug of lead per $cm^2$ of electrode projected area.

6. The REDOX system of claim 1 wherein said aqueous HCl solution is 3 normal.

7. The REDOX system of claim 1 wherein the iron chloride concehtration is a one molar aqueous HCl solution.

8. The REDOX system of claim 1 wherein said chromium chloride concentration is a one molar aqueous HCl solution.

9. The REDOX system of claim 1 and including means for maintaining the reactant fluids at a temperature of from about 55° C. to 75° C.

10. The REDOX system of claim 9 wherein the reactant fluid is maintained at a minimum temperature of about 65° C.

11. A method of operating a REDOX cell of the type having first and second chambers separated by a cation permeable membrane and having first and second carbon electrodes disposed in said first and second chambers, respectively, comprising the steps of:
    directing through said first chamber a first reactant fluid comprised of an aqueous HCl solution having dissolved therein iron chloride, chromium chloride and bismuth nitrate;
    directing through said second chamber a second reactant fluid comprised of an aqueous HCl solution having dissolved therein iron chloride, chromium chloride and bismuth nitrate; and
    applying an electric potential between said first and second electrodes to charge said cell and to deposit a layer of bismuth on the electrode which is at negative electric potential.

12. The method of claim 11 wherein said aqueous HCl is 3 normal.

13. The method of claim 11 and including the steps of: discharging and recharging the cell a plurality of times; fully discharging the cell; and
    charging the cell with an electric potential opposite to that initially applied to the electrodes.

14. The method of claim 11 wherein the cell and the reactant fluids are maintained at a temperature of from about 55° C. to 75° C.

15. The method of claim 14 wherein the temperature is about 65° C.

16. The method of claim 11 wherein said first and second reactant fluids include lead chloride dissolved therein.

17. The method of claim 16 wherein said bismuth nitrate is present in an amount such as to deposit about 50 ug/ of bismuth per $cm^2$ of electrode projected area and wherein said lead chloride is present in an amount such as to deposit about 100 ug of lead per $cm^2$ of electrode projected area on the most negative electrode when the cell is charged from a zero state of charge to a substantially maximum state of charge.

18. A REDOX electrical cell comprising:
    a container having first and second chambers formed by a cation permeable membrane;
    first and second electrically conductive electrodes disposed in said first chamber and said second chamber, respectively, said first electrode being coated with bismuth;
    a first reactant fluid in said first chamber said first reactant fluid being an aqueous HCl solution containing iron chloride, $Cr^{+2}$ ions and nitrate ions; and
    a second reactant fluid in said second chamber said second reactant fluid being an aqueous HCl solution containing bismuth nitrate, chromium chloride, and $Fe^{+3}$ ions, said first electrode being electrically negative with respect to said second electrode.

19. The cell of claim 18 wherein a coating of lead is disposed over the coating of bismuth.

20. The cell of claim 19 wherein the first and second reactant fluids are 3 normal HCl.

* * * * *